(12) United States Patent
Rizzuto, Jr.

(10) Patent No.: US 7,394,023 B2
(45) Date of Patent: Jul. 1, 2008

(54) SLACK CABLE ARRANGEMENT FOR UNDERGROUND ELECTRIC SERVICE CONDUIT CONNECTED TO SERVICE BOXES ON THE SIDES OF BUILDINGS

(76) Inventor: Salvatore A Rizzuto, Jr., 4261 David Dr., Emmaus, PA (US) 18049

( * ) Notice: Subject to any disclaimer, the term of this patent is extended or adjusted under 35 U.S.C. 154(b) by 125 days.

(21) Appl. No.: 11/149,963

(22) Filed: Jun. 10, 2005

(65) Prior Publication Data

US 2006/0005983 A1  Jan. 12, 2006

Related U.S. Application Data

(60) Provisional application No. 60/578,749, filed on Jun. 10, 2004.

(51) Int. Cl.
*H01R 4/00* (2006.01)

(52) U.S. Cl. ........................................ 174/92

(58) Field of Classification Search ............. 174/70 R, 174/70 A, 71 R, 72 R, 74 R, 75 R, 79, 84 R, 174/88 R, 92
See application file for complete search history.

(56) References Cited

U.S. PATENT DOCUMENTS

| | | | | |
|---|---|---|---|---|
| 3,147,337 A | * | 9/1964 | Chennell | 174/72 R |
| 3,473,339 A | * | 10/1969 | Schlafly, Jr. | 405/157 |
| 3,769,443 A | * | 10/1973 | Pierzchala et al. | 174/38 |
| 3,961,229 A | * | 6/1976 | Splitt | 361/641 |
| 4,006,289 A | | 2/1977 | Roe et al. | |
| 4,579,403 A | * | 4/1986 | Byrne | 439/33 |
| 4,864,080 A | | 9/1989 | Fochler et al. | |
| 4,884,863 A | * | 12/1989 | Throckmorton | 385/135 |
| 5,121,458 A | * | 6/1992 | Nilsson et al. | 385/100 |
| 6,031,180 A | | 2/2000 | Schilling et al. | |
| 6,181,861 B1 | | 1/2001 | Wenski et al. | |
| 6,526,858 B1 | | 3/2003 | Smith et al. | |
| 6,646,854 B2 | | 11/2003 | Fowler et al. | |
| 6,766,094 B2 | * | 7/2004 | Smith et al. | 385/135 |
| 6,807,355 B2 | * | 10/2004 | Dofher | 385/134 |
| 2002/0034369 A1 | | 3/2002 | Forrester et al. | |
| 2002/0172489 A1 | | 11/2002 | Daoud et al. | |
| 2003/0123935 A1 | | 7/2003 | Dofher | |

FOREIGN PATENT DOCUMENTS

| | | |
|---|---|---|
| EP | 0726478 | 8/1996 |
| JP | 2001-042134 | * 2/2001 |
| JP | 2001-296432 | * 10/2001 |

* cited by examiner

*Primary Examiner*—William H Mayo, III
(74) *Attorney, Agent, or Firm*—Charles A. Wilkinson; Clinton H. Wilkinson

(57) ABSTRACT

A slack chamber in a form which will extendably retain a loop of service cable ready to pay out slack in the event of ground subsidence is provided buried either in line with an underground cable run or partially buried in line with the service line from the building service downwardly to an underground service line.

22 Claims, 12 Drawing Sheets

Fig. 11
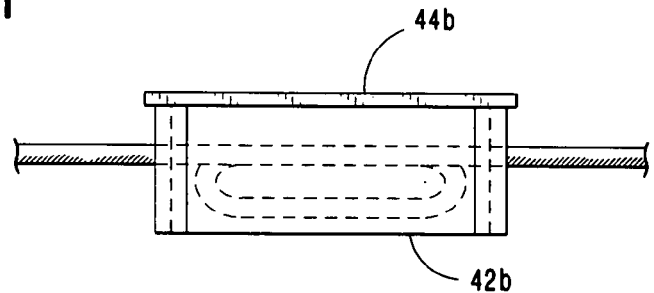
Fig. 12
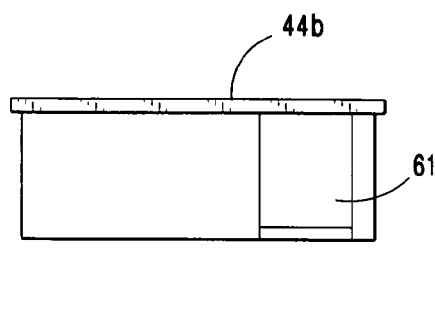
Fig. 13
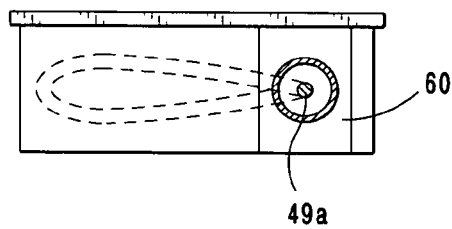
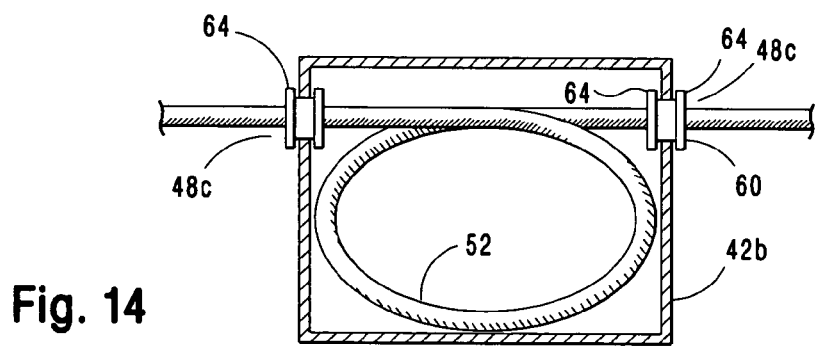
Fig. 14
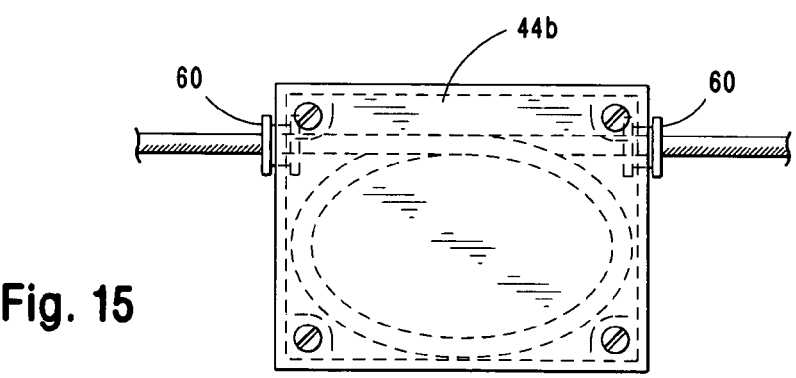
Fig. 15

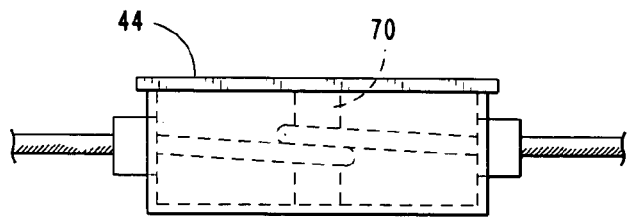
Fig. 20
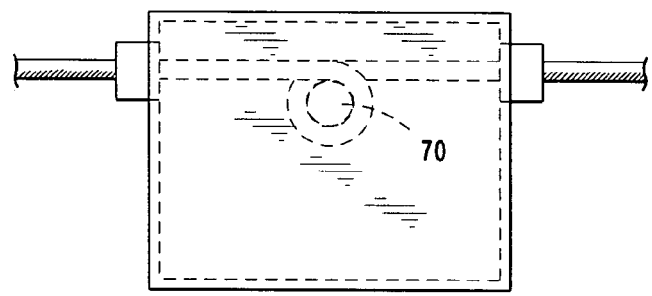
Fig. 21
Fig. 22
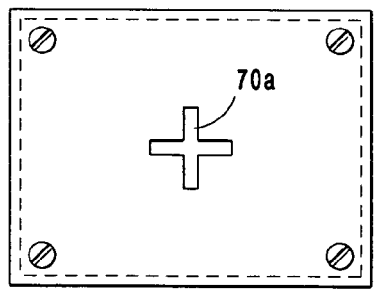
Fig. 23
Fig. 24
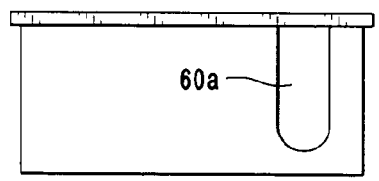
Fig. 25A
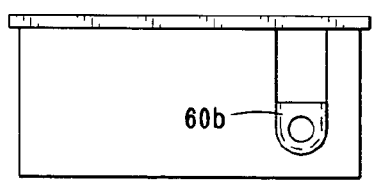
Fig. 25B

SLACK CABLE ARRANGEMENT FOR UNDERGROUND ELECTRIC SERVICE CONDUIT CONNECTED TO SERVICE BOXES ON THE SIDES OF BUILDINGS

Related application claims priority from U.S. Provisional Application No. 60/578,749 filed Jun. 10, 2004 by the same inventor.

BACKGROUND OF THE INVENTION

1. Field of the Invention

This invention pertains to electrical service conduits extending from buried or underground service lines to individual electrical service installations comprised of buildings requiring power and more particularly to providing means for protection of the building electric service from damage and possible interruption as a result of ground subsidence or other disturbance in the area of the underground electrical service lines. More particularly still the invention pertains to a slack provision arrangement to provide additional service cable to allow for any additional length of service line necessary to relieve tension on the service attached to a building induced by ground level alterations.

2. Preliminary Discussion

In the connection of underground electric service to building structures, difficulty has been encountered with settling of backfill over the electrical conduits on building sites. It is not unusual for such backfill to settle several feet or more along with the conduits surrounding the service. Such settlement can initially be at a fairly high rate of several inches or more per month particularly during periods of high rainfall. The force of such settlement is transferred to the conduit and the electrical service wires where they are connected to the electrical service box on the exterior of the building. Even if the service wires are not broken or disconnected by the resulting tension exerted on them, sections of the protective conduit around the service wires are frequently pulled apart or away from each other or from the service box, exposing the service wires and sometimes even pulling the building service box away from its anchoring or even breaking away portions of the building structure to which the service extends. Exposure of the service conduit or wires is not only dangerous because of the danger of severe shock by anyone coming in contact with the service wires or conduit, but constitutes a fire hazard due to possible ignition of surrounding materials in case of breaking and exposure of the wires.

This problem was recognized in U.S. Pat. No. 4,861,942 issued to T.F. Moran, Jr. on Aug. 29, 1989, entitled "Adjustable Riser Assembly", which discloses an adjustable length conduit for protecting underground electrical power service wires between the ground and an exterior above ground service box. Such prior art riser assembly is comprised of a first lower conduit section the lower end of which extends into the ground and has a bend of at least 30° on such end, and a second rigid conduit which connects to the service box on one end and has a larger overall diameter along its lower end so as to slid ingly receive the upper end of the lower conduit section. A very close tolerance is provided between the outer diameter of the lower conduit section and the inner diameter of the upper conduit section, with such diameters being substantially the same so that at least partial sealing between the two diameter conduits is effected. The two conduits overlap and allow for subsidence of the ground surface in new construction while maintaining a substantially sealed conduit protection of the electrical service wires between the service box and the ground. Such continued protection is important not only to prevent children or others from gaining access to and possible experiencing injury from the charged service wires, but also to keep insects and small animals out of the service box and building and to prevent the service box in an extreme but not uncommon case from being bodily ripped from its position on the wall. The Moran Jr. invention therefore addressed a very serious consequence of backfill settlement in building construction.

There are several problems, however, with the Moran, Jr. riser protection assembly which make it in practice impractical and difficult to use and install. First, the close sliding fitting or tolerance between the conduits does not allow for any lateral or side to side movement of the lower conduit with respect to the upper conduit. Thus, if the lower conduit is not installed so that it is exactly aligned with the upper conduit, the outer edge of the lower conduit will press against the inner side of the upper conduit and will not slide easily or possibly even at all due to frictional forces between the conduits. This makes the Moran, Jr. protective assembly very difficult to hook up, or install, since, in most cases, it is difficult and time consuming to install the conduits so that they are exactly aligned. Furthermore, just as settling forces may cause downward strain on a nonadjustable conduit, such forces may also place significant lateral pressure on the below ground portion of the adjustable conduit which may in itself exert sufficient force to loosen the conduit from the wall. Yet another problem with the Moran, Jr. assembly is that if the upper slightly larger conduit and the lower smaller conduit are not exactly aligned, when the smaller enters into the larger it can be inserted only a minimal distance before its edge begins to severely impact the inside of the larger pipe and refuses to slide farther without displacing the larger conduit which may be already secured to the wall when the electric lines are installed. Consequently, the lower small conduit is extremely difficult to install or insert into the larger upper conduit again primarily due to the close fit or tolerance between the upper and lower conduits.

The present inventor recognized the disadvantages of known sliding or slip joint type devices, and conceived of a new assembly that overcomes all of such disadvantages. In particular, the present inventor solved the problem of the lateral stress placed on the sliding portions of the conduits by using a larger inside diameter conduit assembly or fitting as the outer conduit plus placing a deformable sealing ring at the end of such fitting between the conduits. The deformable sealing ring is secured to the inner diameter on the lower end of the assembly, so that the section of conduit that extends into the ground will connect with such assembly with a close fit between it and the sealing ring, rather than with the inner diameter of the assembly or fitting itself. The improved slip-joint provided is described and claimed in applicant's prior application.

In addition, the prior patented invention did not address the possibility that subsidence of the ground or backfill might stress the underground electrical service conductor or cable itself and possibly pull it loose from its connections and the present inventor therefore provided an improvement in the basic sliding coupling in the top to provide an additional length of wire conduit to allow for slack therein to allow for the extra conduit that may be necessary to provide a continuous length of cable between the service connection and the power line connection at the street in case of settlement with additional inevitable lengthening of the path which a cable must follow in its path from a service box on a building to a service connection at the street. This allowed additional service cable to be paid out from the storage in the upper portion of the connecting slide fitting to allow for the lengthening of the conduit and tension of the electric cable itself.

However, it has now been found that providing a slack reservoir in the upper end of the slide fitting providing additional extension for the conduit attached to the building may not always be sufficient and that a more easily paid out length of excess cable may be desirable more in line with the underground section of the main run underground of the cable from the building to the street service. The present applicant has supplied such a slack arrangement in accordance with the present invention by providing a slack receptacle or container adapted to contain an underground loop or loops of electrical conduit which are automatically paid out upon the application of tension upon the electric cable caused by subsidence of backfill or the like. The container or receptacle may be constructed of polyvinylchloride, the approved material for service cable conduits because of its weather resistance and fire resistance in case the wires or electrical conduit is short-circuited in contact with it. However, sine there is little danger of fire underground, other structural plastics may be used. The slack cable or conduit within the receptacle or box is easily available and is placed in the receptacle through a door or cover and will be adapted to contain at least one full loop of wire, cable or conduit arranged to be easily paid out in either direction from the receptacle in case of need due to subsidence or any other severe tension on the electrical service. Since the receptacle is buried or arranged in line with the electrical service it is arranged to easily pay out cable or conduit in either or both directions upon tension being exerted upon the cable tension loop within, thereby preventing any accumulation of tension, due especially to subsidence, from tensioning the electrical service box or the service to the street and possibly detaching or breaking the wires or even pulling the entire service from the wall of the building to which it is connected. The slack receptacle should be strong enough to withstand the weight of earth over it, plus the possible weight of machinery and vehicles passing over it and is preferably substantially impervious to the silt laden water percolating around it. While moisture entering the slack receptacle will not usually be deleterious to the electrical conduit or cable, which is designed for underground service in any event, the collection of silt within the slack receptacle can cause any cable loop therein to become substantially immobile and prevent it from being able to pass the slack in the cable from the receptacle. See, however, the further discussion hereinafter.

Preferably, therefore, the orifices provided in the sides of the conduit slack receptacle ought to be either essentially plugged with an effective seal such as electrical sealant or so-called duct sealant material or will be provided with a strong flexible gasket sealing against the electrical cable. While the usual underground cable run will be provided on the sides and preferably the top with so-called "screening" in the form of a layer of small broken rock to protect the cable and conduit from deleterious underground movements and influences including mud and silt flows, such screening may not be sufficient to prevent the passage of very fine silt particles. While larger clastic or divided materials will be excluded by such broken rock screening, fine silt and the like may still percolate through the screen and upon entrance in the slack receptacle settle in the center of a coil of wire or cable and effectively resist the contraction of said coil or cable, effectively resisting payout of the coil and the relief of tension caused by earth subsidence. This, however, depends also upon how much flow of moisture is likely to occur through the slack chamber and if the chamber is carefully designed to limit such flow no serious consequences may result.

The primary focus of this invention, therefore, is the provision of a sturdy damage proof containment suitable for the containment of at least one large loop of electrical service wire from which wire or service cable can be paid out simply and reliably to provide extra slack to prevent serious electrical service tension on a wire service and into which containment means the electrical service cable can be conveniently strung when installing the electrical service. It is preferred that only a single large loop be used.

Several embodiments of the invention can be used dependent upon the local utility custom respecting the laying of conduit to the street service, i.e. whether conduit is laid only from underground upwardly to the building service with the remainder of the run to the street service being without conduit protection, this being referred to as direct burial or whether protective conduit surrounds the electrical cable all the way to the street service referred to as non-direct burial.

3. Description of Related Art

U.S. Pat. No. 4,006,289 issued to N. P. Roe et al. on Feb. 1, 1977, entitled "Electromechanical Cable Deployable in a No-Torque Condition, and Method," discloses a method and means for winding cable torque free in a coil placing one full twist in the coil with each winding so that when removing the cable from the coil it is presented without twist. The cable can be wound on a reel or into an open container. There appears to be no disclosure of the coil as a supply of cable for pay out to relieve tension, however.

U.S. Pat. No. 4,864,080 issued to H. P. Fochler et al. on Sep. 5, 1989, entitled "Terminator Connector Fitting for Electrical Box and Conduit System," broadly discloses the use of a connector box for electrical fitting, but does not disclose an arrangement for coiling extra cable in a fitting below ground level to provide slack to relieve tension on the cable in the case of ground subsidence.

U.S. Pat. No. 6,031,180 issued to R. J. Schilling et al. on Feb. 29, 2000, entitled "Below Ground Pressurizable Cable Interconnect Enclosure," discloses a specialized below ground interconnect chamber for electrical cable. The chamber is formed from plasticized concrete and is provided with internal environmental gases and is attached to PVC conduit. The cable connection chamber is designed to be useful for various interconnect purposes.

U.S. Pat. No. 6,181,861 issued to W. Wenski et al. on Jan. 30, 2001, entitled "Arrangement for Branching a Telecommunications Cable Containing Several Stranded Elements with Optical Fibers," discloses a below ground chamber in which a number of fiberoptic cables can be stored in individual plastic cassettes or tubes and from which when a new connection to a local customer is to be made one or more of the fiberoptic cables or strands can be paid out to the customer from coiled fiberoptic strands stored in cassettes in the below ground chamber.

U.S. Pat. No. 6,526,858 issued to K. J. Smith et al. on Mar. 4, 2003, entitled "Cable Breakaway Assembly," discloses an alternative way of preventing excessive tension on communication lines including a knife severing arrangement to sever the lines when excessive tension on a line occurs.

U.S. Pat. No. 6,646,854 issued to W. J. Fowler et al. on Nov. 11, 2003, entitled "Lightning Suppression Attenuator and System Employing Same," discloses an underground container in which a conductive strand is coiled surrounded by conductive grit. Preferably the chamber outside the coil is filled with a conductive steel grit. The interior of the chamber being surrounded by conductive grit to draw off any charge from a lightening strike the cable within is neither intended to nor would be able to pay out any substantial amount of slack cable in case tension was applied to the cable.

U.S. Published application No. 2002/0034369 on Mar. 21, 2002 to J. H. Forrester et al., entitled "Apparatus for Storing Surplus ADSS Cable," which is a CIP of several earlier applications previously issued discloses an adaptation of a presently popular arrangement for providing slack which can be paid out in overhead lines when required. The arrangement is designed for use in overhead lines and not for relieving tension on underground lines.

U.S. Published application No. 2002/0172489 on Nov. 21, 2002 in the name of B. H. Daoud et al. entitled, "Fiber Splice Holder with Protected Slack Storage Feature," discloses a fiberoptic splice holder with a slack storage feature. The application explains that in fiber splice holders which keep various spliced fiberoptic fibers separated and prevent the fiberoptic element from being bent at too great an angle it is convenient to have slack provided right on the splice holder.

U.S. Published application No. 2003/0123935 on Jul. 3, 2003 in the name of D. Dofher entitled, "Subsurface Fibre Optic Cable Network Installation," discloses a small junction box for fibre optic cable with at least one separable sidewall and sealing means for fibre optic cable entering from the side. The junction box is designed to fit into narrow subsurface openings. A wire loop may be on the outside to hold further loops of fibre optic cable.

Patent document EP0726478 to G. S. Cobb et al. published Aug. 14, 1996, entitled "Splice Holder Assembly for an Optical Fiber Cable Splice Closure," discloses a splice holder for a fiber optic cable in which slack loops of fiber optic cable can be loops in the bottom.

None of the prior art known to the applicant discloses a slack cable box or case adapted to be used in the manner of that of the present invention for containing electric service cable looped in a loose coil in a slack coil container adapted for burying at the end of an underground conduit and to provide cable slack in the event of ground or fill subsidence, which cable slack will allow for such ground subsidence and prevent severe tension from being applied to exterior service facilities on the wall of a building and further deigned to have cable simply and easily coiled manually into the slack container by personal laying the conduit in place.

OBJECTS OF THE INVENTION

It is a principal object of the invention to provide slack in underground electrical service lines for the express purpose of providing for ground subsidence particularly in backfill in new construction.

It is a still further object of the invention to provide a slack container formed of a fire resistant plastic material designed to store for pay out, if required, from a below ground location of deliberately stored coils of slack in the service line.

It is a still further object of the invention to provide an at least partially coiled supply of slack service line in an underground pay out chamber in a position to pay out a section of service cable upon need due to ground subsidence away from a fixed connection of such cable service to a building service.

It is a still further object of the invention to provide a rugged practical slack service cable storage container for underground burial.

It is a still further object of the invention to provide a storage container with sufficient strength to resist normal above ground loads including the weight of humans and small machinery without damage.

It is still further object of the invention to provide a slack storage chamber that can be used not only below ground, but also in an above ground position adjacent to and below a building service connection.

Further objects and advantages of the invention will become evident from careful review and consideration of the following description and appended drawings.

The present invention has solved the former serious problem of tension applied to service facilities on the side of a building where electric power enters the building when the electric service enters the building through underground conduit and the ground through which the conduit runs subsides significantly particularly due to the progressive settlement of fill in new construction, but also from other ground movement such as may be caused by earthquake or the like.

SUMMARY OF THE INVENTION

The present invention provides a method and means for storing easily paid out slack in an underground or occasionally other locations when tension is applied to such service by ground movement by providing a sturdy slack cable storage enclosure which is preferably buried in the ground with at least one coil of cable therein and leading on one end from the enclosure to the building service and on the other to the street service. The storage enclosure preferably is in the nature of a flattened degradation resistant enclosure closeable with a top lid or section and having opposed orifices on the sides through which the electrical service cable slack can be dispensed in either direction, although usually toward the building structure, since the settlement of fill is invariably downwardly away from the service, or service box on the structure.

BRIEF DESCRIPTION OF THE DRAWINGS

FIG. 11 is a side elevation of an even more preferable alternative embodiment of the slack receptacle of the invention showing an electric service cable extending therefrom at both ends.

FIG. 12 is an end elevation of the slack receptacle shown in FIG. 11 without its usual cable or cable mounting slide inserted into it.

FIG. 13 is an end elevation similar to FIG. 12, but with the cable slide containing the exit orifice for the cable mounted in place surrounding the cable.

FIG. 14 is a top view of the top of the slack receptacle of the invention with the top removed and demountable cable slack slide orifices mounted together with a cable in the receptacle.

FIG. 15 is a top view of the improved slack receptacle of the invention shown in FIG. 14 but with the top or lid of the receptacle mounted in place as it would be when buried and in use.

FIG. 20 is a side elevation of a slack receptacle of the invention as shown in FIGS. 8 through 11 incorporating a reinforcing central drum-like structure.

FIG. 21 is a top view of the receptacle of the invention showing the cable drawn tightly around the central drum after maximum payout of cable slack.

FIG. 22 is a view of a lid for the slack cable receptacle with a cruciform type central reinforcement attached to it.

FIG. 23 is an end elevation of a slack receptacle similar to that shown in FIG. 12, but with a different arrangement of a side orifice slot in it.

FIG. 24 is an end elevation of the slack receptacle shown in FIG. 23 with a matching sliding side orifice in the side orifice in it.

FIG. 25A is an enlarged end view of sliding side orifice shown in FIG. 24.

FIG. 25B is a side view to the same scale as shown in FIG. 25A.

DETAILED DESCRIPTION OF INVENTION

Figure 1:
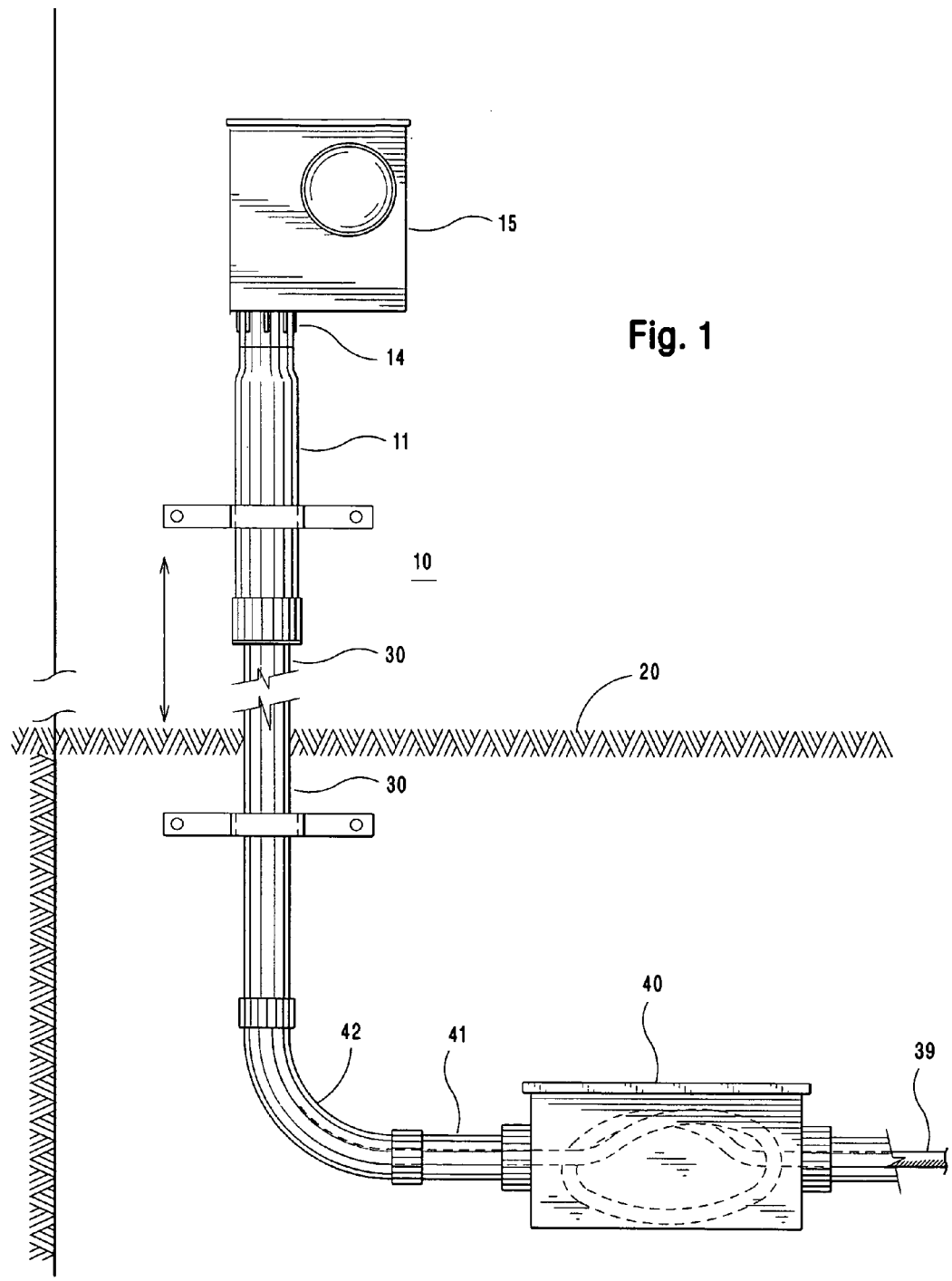
FIG. 1 is a sketch of the use of the slack receptacle of the invention in an installation of conduit attached to the wall of a building included along with use of the present Applicant's prior invention of a conduit slip joint upon a building wall.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Serious problems have been encountered in recent years with damage to the electrical service of building structures by subsidence of fill used to fill in the excavation usually made to contain the foundation and cellar of the building or even a partial foundation using heavy equipment. At one time in the past the necessary excavation for foundations was made by hand tools and later by relatively small equipment and an attempt was made because of the cost not to excavate more than was strictly necessary. In such instances or times even in large developments the buildings usually conformed also to the contour of the site. However, with the availability of larger earth moving equipment which can move considerable more earth at a time, more earth is moved just to provide access of the equipment to the excavation site and the site itself tends to be leveled to some common level as a matter of convenience. As a result, there tends to be overall more excavation and more filling and backfilling at completion so that there is more final backfill, which is seldom well consolidated and particularly in rainy seasons considerable more subsidence of the site as a whole and between individual buildings occurs. Since most modern developments have underground electrical service at least from the street service and such service is buried often largely in extensive fill while the building foundations are for practicality and stability constructed on or close to the lower level of excavation, when subsidence occurs such subsidence is of the underground service away from or downwardly with respect to the building. Subsidence of up to 6 inches is common and subsidence of several feet or more is not unusual. Thus, anything connected to the outside of the building and also at least partially situated in the fill is likely to be subject to disparate forces which in the case of underground electrical service can exert hundreds or even thousands of pounds of force upon the external switch box of the electrical service possibly severing or breaking the wires or pulling the external service box from its fastening and causing not only serious damage but becoming an electrical shock and fire hazard.

The present invention has solved the former serious problem of tension applied to electrical service facilities, i.e. the exterior box and associated wiring supported upon, or attached to, the wall of a building where such service is connected to the external service or feeder lines through buried electrical service or conduit extending from the street service. Such service can be basically of three types, (a) where a conduit containing the actual wires extends all the way from the street service, referred to as nondirect burial, (b) where the actual wires extend from the service box or building service through a conduit to the level of burial of the wires and the actual electric wires then extend from this point out to the street service without external conduit protection, referred to as direct burial, and (c) where the actual electric cable is protected with external conduit only to or slightly below the level of the ground or in some cases not protected at all, a somewhat older method of direct burial. The conduit, of course, serves not only to protect the cable from damage, but to protect parties who might otherwise come into contact with the cable and possible electrical charge in case of failure of the cable insulation. The problem of settlement of fill carrying with it and placing tension on the electrical service varies somewhat depending upon the characteristics of installation. In the case of a service cable extending all the way to the street service protected by conduit there will normally be some slack provided in the cable by a slight snaking of the cable from side to side in the conduit. However, the conduit will be pulled down with any settlement of fill and any slack will frequently be quickly exhausted or will be essentially unavailable toward the outer end of the conduit because of friction with the interior of the conduit. A service cable extending to the street service in contact with the surrounding ground material will be unable to straighten out upon tension being applied and as a result even more tension may be applied to the building service not infrequently breaking the wire, pulling connections apart or even pulling the service from the wall of the building. An external protective conduit having the usual 30 to 90 degree curve on the end furthermore will itself be carried down with subsidence of the ground and place tension on the building service. It is this type of tension on the conduit which the present applicant's previous invention of an improved slip-joint is designed to effectively remedy. However, while some embodiments of such improved slip-joint may embody cable storage or slack storage areas, such arrangement may not supply enough slack and may furthermore be difficult to effectively arrange sufficient slack in. To remedy this problem the present inventor now has developed the present independent slack chamber arrangement which is preferably itself buried in the line of cable to easily and simply provide slack electrical cable in case of subsidence of the ground level. The arrangement is effective and convenient and very easy to install and, where the electric cable is protected all the way to the street service by conduit or where conduit leads the electric service line into the ground and then by a curve at the lower end of the conduit directs the cable to the street service, will preferably be buried in line with the cable connected underground and at least on one side with the protective conduit. However, where the electric cable is only conducted to the ground level or thereabout with a protective conduit or does not even have a protective conduit, the slack chamber of the invention may be used in position turned at 90 degrees and partially buried directly under the building service without a slip-joint in the conduit.

In accordance with the present invention, a slack containment enclosure or chamber is made preferably with an internal volume sufficient to contain at least one easily arranged coil of electrical cable with an open top closeable with a cover. The slack chamber is preferably only sufficiently deep to easily contain one or at most several coils of cable containing several feet of the electric cable involved without severe curvature of the cable. Such cable is preferably coiled about but not against a central combined drum or support between the floor of the enclosure and the lid sufficient to support the weight of a man or small machinery when buried. Opposed slots in the side of the chamber open at the top when the lid is not in place or closed provide for passage through the walls of the chamber of the electrical cable during and after installation and there are preferably open rings or guides accommodated in the slots in the sides through which guides the electrical cable is conducted. The slack chamber of the invention may be constructed of various sturdy structural plastics including the usual or resistant polyvinylchloride composition normally approval for electrical conduit and is extremely easy to install and to coil electrical cable in and close and has solved a serious problem in a single and cost effective manner. In many cases it will be used with the inventors improved slip-joint invention for conduit and the following description and explanation provides additional details of the invention.

FIG. 1 is a front elevation of a centrally broken illustration of a general disclosure of a broadly illustrated version of the invention of an underground slack receptacle for use in connection with underground electrical service connection with a building and showing combined with the slack receptacle of the present invention the present Applicant's previous invention of an extensible service connection of a building service box with an underground protective conduit for electrical service cable. In such arrangement a slip joint fitting or assembly 10 is connected to an electrical service box 15 through a screw threaded section or fitting 14 for connecting the upper end of the fitting assembly 10 to the lower end of such electrical service box 15. The connecting fitting 14 is either integrally connected or screw thread connected to the outer member or tube 11 of the slide or slide joint assembly 10. A smaller conduit or tube 30 is partially slid into the lower end of the tube 11 through a resilient gasket, not seen in the figure, which is designed to form a resistant seal between the two slide members 11 and 30 to exclude undesirable wildlife and insects as well as undesirable air flow or the like. As explained in the present Applicant's earlier application during subsidence of the ground level 20 the lower conduit 30 will be pulled downwardly sliding in the gasket within member 11 and will not as a result of such sliding pull down the member 11 or the attached service box 15 with it. Furthermore, because of the smaller outside diameter of the conduit section 30 than the inside diameter of the larger conduit section 11 plus the resiliency of the gasket between these two tubular structures such tubular structures need not be aligned perfectly to enable the smaller to enter into the end of the larger, making it much easier to assemble the sliding fitting or arrangement in the field.

While in the Applicant's previous application, there are also disclosed several embodiments of the outer slip section 11 in which the top is expanded to contain a supply of slack electrical cable for payout in case of ground subsidence, it is difficult to coil and uncoil normal heavy electrical conduit in the constricted space of even a fairly large expansion of the tubular slip member 11. It has become evident, therefore, that a better arrangement would be desirable.

As a result, the present inventor has now developed an underground slack cable arrangement 40 shown connected to the lower leg of the electrical conduit 41 surrounding the electric service cable, which service cable 39 is seen extending to the right below ground level 20. Due to expansion or sliding of the lower conduit section 30 within the upper conduit section 11 as the ground or any backfill settles, the electric cable 39 within the lower conduit section is in effect pulled or displaced upwardly within the conduit or, more particularly, as the conduit 30 descends with the subsidence of the ground level an additional length of electrical conduit becomes necessary, if the electrical wire or cable is not to be extended and eventually broken or else its connection with the delivery box 15 broken or severed, for there to be slack provided to enable extension of the electrical cable itself over a greater path. In other words, a greater length of electrical cable becomes necessary. In accordance with the present invention such extension is allowed by providing the slack receptacle of the invention with extra or slack cable within it in a manner making such slack cable available for paying out.

Figure 2:
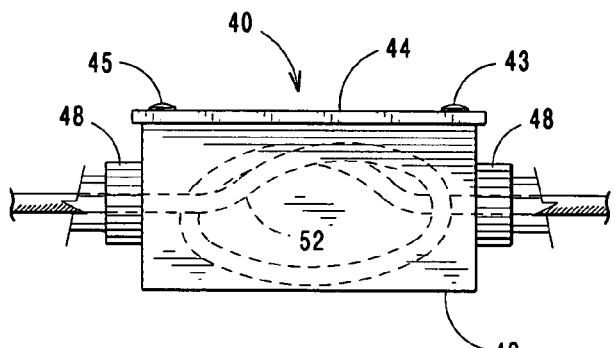
FIG. 2 is a side elevation of a slack receptacle in accordance with the invention as shown in FIG. 1.
Figure 3:
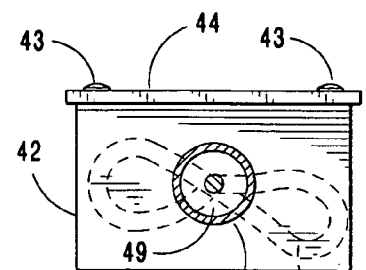
FIG. 3 is an end view of the receptacle shown in FIG. 2.
Figure 4:
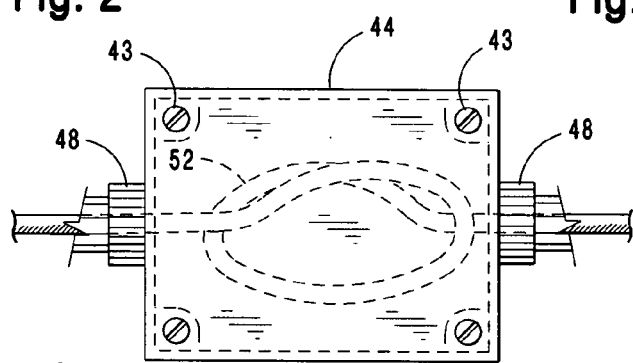
FIG. 4 is a top view of the receptacle shown in FIGS. 2 and 3.

In the present invention, therefore, the necessary slack is provided by the slack receptacle 40 which is preferably positioned on the same level as or at the depth at which the electrical cable itself is buried, normally about three feet deep in order to protect from normal excavation or digging by contractors or gardeners or the like plus heaving and displacement by winter freezing. Such slack receptacle, which is shown in additional detail in FIGS. 2, 3 and 4 is comprised in a first embodiment of preferably a polyvinylchloride or other plastic box-like bottom structure 42 with a top 44 secured to the upper portion of the bottom structure by fastenings 43 shown as threaded type fastenings. The top should fit tightly to prevent the percolation of silt carrying moisture or water into the receptacle, although mere moisture is usually not detrimental, since the electric cable is designed to be waterproof in any event by the provision of fairly heavy moisture resistant insulation. At the ends of the receptacle as shown in the figures there are provided cylindrical structures 48 with central orifices large enough for the electric service cable or conduit to be easily threaded through to form preferably a single loop 52 within the receptacle exiting the end of the cable receptacle through the opposite orifice. The loop 52 of service cable is formed or made large enough so that it contains sufficient excess cable to be able to pay out enough cable to make up for any subsidence of the ground level from the initial graded ground level, such subsidence being not infrequently from one half to three feet where significant subsidence is encountered. It is desirable that the excess or reserve cable be contained in a single loop, because electric service cable is large cable, normally somewhat over two inches in diameter which does not easily form into or draw out of small loops. While there could be more than one loop if the coil diameter is not excessively constricted an excessive number of closely packed loops is undesirable because of possible excessive electrical induction between the coils. A single loop, however, will experience only a single mild induction effect where the cable crosses which can be ignored so far as any effect on the current is concerned. The orifices 49 in the receptacle may be provided with resilient gaskets sealed in the interior of the cylindrical structure to seal the orifice against the cable to prevent fine silt over time from being carried into the receptacle with entering moisture and possibly interfering with the reduction in size of the loop of cable within the receptacle. Although, as pointed out above, the screening of fine rock particles which is normally laid around and particularly to the sides of the underground conduit will tend to screen the cable and receptacle from larger particles and ground movement, such screening may not be effective in excluding very fine silt which may be carried or percolate with moisture through the screening and find its way into the receptacle effectively surrounding and settling inside the cable loop and over time consolidating sufficiently to substantially immobilize such slack cable loop. Fortunately most subsidence of the backfill around a building is likely to occur within a few months or years of laying the cable so that the loop of slack in the slack receptacle may be expected to be activated prior to any silt load having time to consolidate significantly. However, both the rapidity of subsidence of backfill and the percolation of moisture in liquid form through any crevice or small opening into the receptacle will be dependent in large part upon the amount of rain which is had in any particular period and the time available for consolidation may thus vary considerably. Rather than providing a resilient tight fitting gasket in the orifices into and out of the receptacle 40, the orifice or orifices 49, after the cable is installed in place may be plugged with a putty composition known as "duct compound" such as is usually used to plug any space about conduits or cable passing into an outdoor service box or through an opening through the wall of a building into the interior. Such duct compound sets up to a fairly well consolidated consistency and will seal the opening quite effectively so long as major movement or payout of the cable through it is not effected. One side of the receptacle will be, as shown, connected to the polyvinylchloride conduit extending via a curved section 42 to the slip arrangement, with the slip fitting assembly 10 secured to the building wall while the exit from the receptacle on the other side will lead either to a further conduit leading to the service supply or, in some cases, simply to a run or stretch of electrical cable laid unprotected in the ground except for the usual "screening" and leading to the service supply point usually referred to as the "street service." As indicated above, the size of the slack receptacle must be large enough to contain essentially a single loop of cable arranged so that it will be easily withdrawable from the receptacle. The maximum single loop content of the receptacle will be attained if an original loop extends from a lower corner of the receptacle to an upper corner or vice versa.

Figure 5:
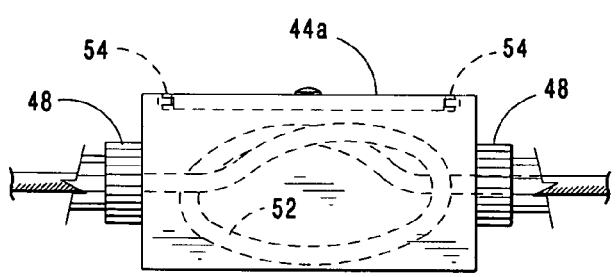
FIG. 5 is a side elevation of an alternative embodiment of the receptacle of the invention having a pivoted lid.
Figure 6:
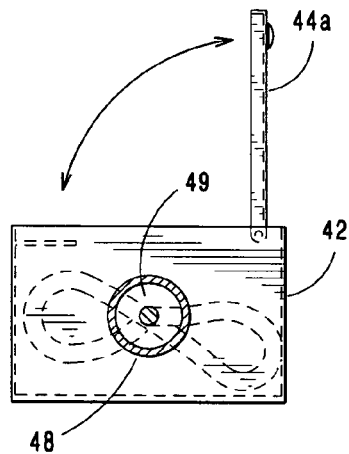
FIG. 6 is an end view of the embodiment shown in FIG. 5 with the lid pivoted upwardly.
Figure 7:
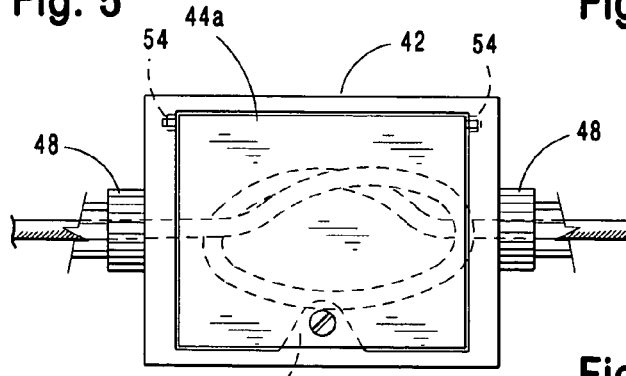
FIG. 7 is a top view of the embodiment shown in FIGS. 5 and 6.

FIGS. 5, 6 and 7 show, also partially in phantom, essentially a similar slack receptacle having a pivoted top 44a secured at one side by hinge pins 54 and secured in a closed position by a threaded member 56. Again, the hinged top should preferably be provided with some form of gasket arrangement to exclude water bearing fine silt or the like so the cable loop 52 may not become bound in place by a deposit of fine silt around it inside the receptacle and particularly within the loop.

Figure 8:
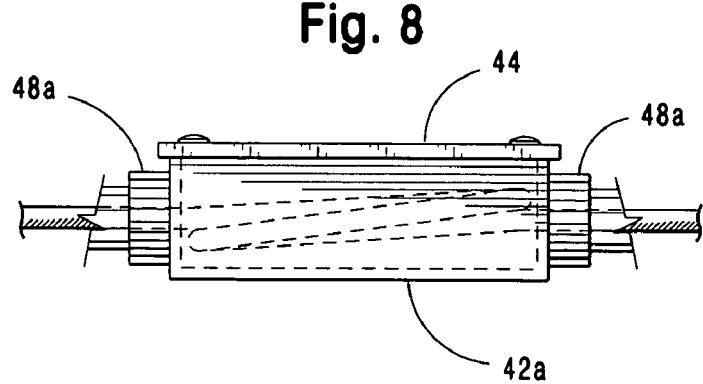
FIG. 8 is a side elevation of a preferred embodiment of the slack receptacle of the invention.
Figure 9:
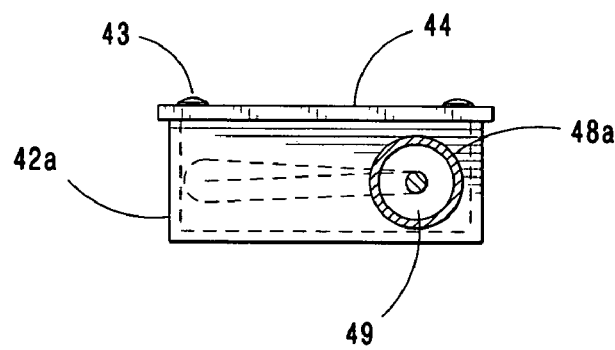
FIG. 9 is an end elevation of the preferred slack receptacle shown in FIG. 8.
Figure 10:
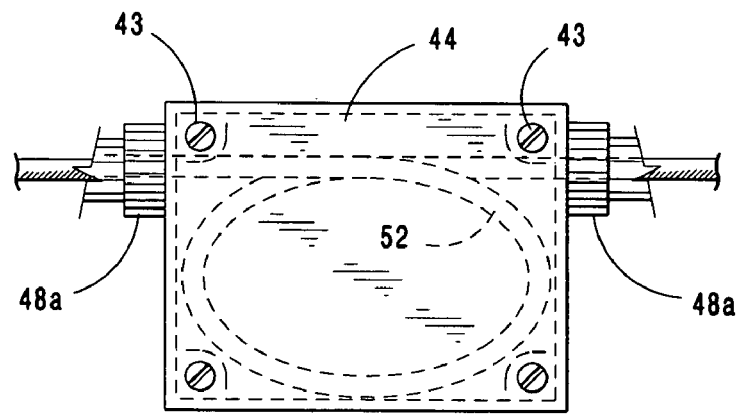
FIG. 10 is a top view of the preferred slack receptacle shown in FIGS. 8 and 9.

FIGS. 8, 9 and 10 are respectively side and end elevations and a top view respectively, again partially in phantom, of a preferred embodiment of the invention in which the depth of the slack receptacle 42a of the invention is preferably reduced and the exit and entrance orifices 48a are moved to one side or adjacent one edge of the receptacle as shown. This enables the electrical cable to be passed into one side of the receptacle and looped therein and then passed out the other side without any substantial extra curvature in the cable other than the slack loop itself and, therefore, also makes it easier for the slack contained in the receptacle to be paid out due to tension being placed on the cable as the result of backfill subsidence or the like. One result of the height of the receptacle being decreased is that it better stabilizes the loop 52 in the cable within the receptacle. By positioning the orifice location to one side of the receptacle, or next to one edge of the receptacle, the electrical cable is enabled to extend straight from an external run into the receptacle, curve in a single loop within the receptacle and then without any other bends or curvature other than the central loop curvature plus a straightening at the termination of the loop to extend from the receptacle with only a minor straightening of the electrical cable, thus significantly decreasing the force necessary to extract any necessary slack from the slack receptacle. With the orifices positioned in the center of the sides of the receptacle as in FIGS. 1 through 7, on the other hand, the cable requires not only a straightening before leaving the receptacle, but also requires a small but significant reverse bend thus requiring more force to be exerted to extract cable from the receptacle. While this may be desirable where more resistance is desired to prevent undue payout of excess wire or cable this is not usually desirable in an underground environment.

Figure 16:
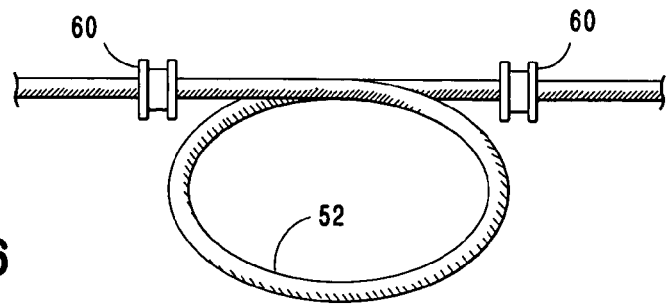
FIG. 16 is a top view of a cable with the slides or slide orifices of the invention placed over a loop of the cable ready to be slid into place as shown in FIG. 14.

FIGS. 11 through 16 illustrate a further even more preferred embodiment of the invention substantially as shown in FIGS. 8 through 11 but in which there is a further improvement enabling the normal looping tendency of a wire or cable coil which has been originally in a coil before use, to be taken advantage of to form the slack coil before it is placed in the slack receptacle and which is then slid bodily into the receptacle, preferably after the receptacle is positioned or is ready to be placed in an excavation. Referring first to FIG. 14, there is shown a top view of a slack receptacle 42b having a demountable orifice structure 48c on both ends. Such orifice structure comprises as shown a plastic plate or fitting 60 of greater thickness than the slack receptacle walls and having an orifice 49a in the center. See FIG. 13. The plate has two extensions 64 on the sides forming overall in profile the shape of an H designed to just encompass the outer or side edges of a rectangular opening 61 in the side of the receptacle 42b on both ends. As seen in FIG. 16 the slide plates, sometimes referred to as guillotine pieces 60, may be mounted upon or passed over the cable before the cable is formed into a loop (which it does very easily immediately after having been unrolled from a coil) and after the cable is formed into a loop it is then positioned over the receptacle and the slide plate sections 60 slide downwardly into the receptacle bottom in the rectangular openings. When the top 44b is then placed upon the top of the receptacle and secured by screw threaded fasteners, the slide plates 60 are held securely in place with the extensions 64 straddling the sidewalls of the orifice 61. As in previous embodiments of the invention the orifice and all openings should be supplied with gasketing material as a seal or be sealed with duct seal or putty which will exclude silt laden underground water flow into the receptacle. The loop of electrical cable will then upon tension applied to it due to ground subsidence or subsiding of backfill or the like decrease in size paying out slack and finally may even straighten out entirely. However, it may be difficult for the cable to straighten out completely because a twist would then have to be absorbed by the cable and there is a tendency for a small kink to be formed instead. Consequently, in order to obtain the amount of slack payout calculated to ordinarily be sufficient, it may be desirable or even necessary to design the receptacle to contain a larger loop containing more reserve cable than calculated to be sufficient to allow for or to provide for any extension of the cable required for lengthening of its path due to subsidence of the ground level. The remaining figures of the series FIGS. 11 through 16 show in sequence other aspects of the guillotine or slide plate form of the invention. More particularly FIG. 11 is a side elevation thereof, FIG. 12 is an end elevation thereof showing the opening 61 where the slide fitting or orifice plate will be accommodated, FIG. 13 shows the orifice plate or fitting 60 in place, FIG. 14 is a top view of the receptacle with the top removed to better show the top of the orifice plates and a run of cable in a loop through the slack receptacle, FIG. 15 is a top view with the top 44b in place and FIG. 16 as described shows a loop of cable with the orifice plates positioned on both sides prior to placement in the openings 61 in the receptacle and placement of the top 44b on the receptacle.

Figure 17:
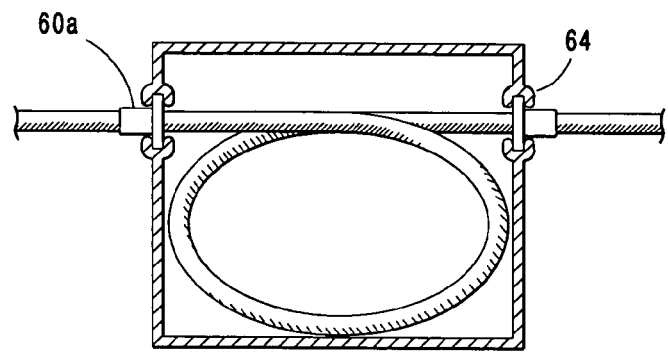
FIG. 17 is a view of a slack receptacle with a slightly different slide or guillotine orifice mounted in both ends.
Figure 18:
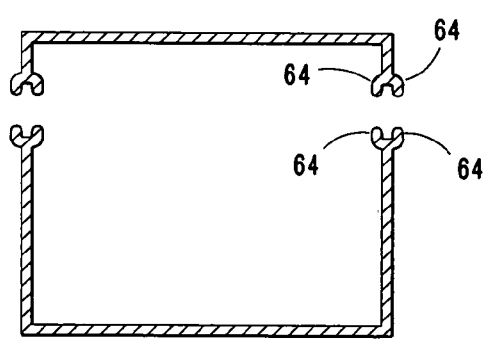
FIG. 18 is a top view of the lower portion of the receptacle shown in FIG. 17 without the slide orifice fitting mounted therein.
Figure 19:
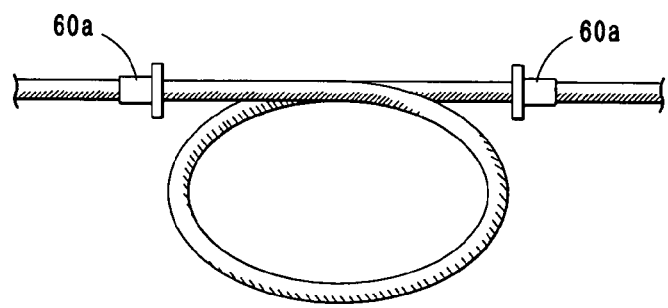
FIG. 19 is a view similar to FIG. 16 showing, however, the embodiment the slide or guillotine orifice arrangement shown in FIGS. 17 and 18 mounted upon a cable loop prior to placement in the receptacle shown in FIG. 18.

FIGS. 17 and 18 show a further alternative embodiment of the slack receptacle of the invention similar to that shown particularly in FIGS. 14 and 16 in which the side extensions aligning the slide or guillotine orifice sections 60a are positioned or located on the sides of the rectangular opening in the side of the receptacle rather than in the slide or guillotine member itself. Such side extensions are designated by reference numerals 64. FIG. 19 which is similar to FIG. 16 in the previous series of drawings and shows the slide or guillotine orifice plates 60a of this embodiment mounted on a loop of cable ready to be slid into place between the extensions 64 on the sides of the openings in the side of the receptacle. It will be noted that since the slide plate is thinner in this embodiment the actual orifice is positioned in an extension from the thinner slide plate. The two arrangements shown in the two sets of figures are equivalent so far as operation is concerned.

As will be understood, the side extensions whether on the sides of the opening or on the sides of the slide member should be sufficiently tight against the opposing member to effectively seal it against the entrance of liquid carried silt or the like. Alternatively, a gasketing or sealant may be applied. A sealant including any hardenable water resistant material may also be used, since once the receptacle is positioned in its place it will not be removed or for that matter the receptacle opened again unless service to the cable or the installation of new cable is required. The same is true of the sealing of the top of the receptacle to the lower portion, since the top also is usually applied permanently until some service or repair to the electrical service is required, which should be at fairly infrequent intervals. Such sealing is thus, unlike the gasketing or other sealant, required to seal the space between the cable and the orifices in the receptacle through which it passes, not necessarily resilient.

FIG. 20 is a figure similar to FIG. 11 and FIG. 21 is a figure similar to FIG. 15 showing the receptacle provided additionally with a central lid brace or support 70 positioned in the center of the receptacle within the cable loop and in which in FIG. 21 the loop is shown as having been contracted by paying out slack until the loop is pulled tightly about the brace which then serves as a loop drum to hold a minimum loop. The receptacle will normally be 28 inches in length, 18 inches in width and 5 inches high, depending, however, upon the size loop of cable which is desired in the interior. Using the stated dimensions, however, there are a total of 504 square inches or 3.5 square feet of upper, essentially lid, surface exposed to the over burden which may weigh between approximately 600 and 1000 lbs. assuming the receptacle is buried under three feet of earth fairly well saturated with varying amounts of moisture pressing down upon the lid, which is supported only at or around the edges. This places a considerable weight loading upon the lid. In order to aid in supporting such weight, it is desirable to provide a central brace 70 under the center of the lid positioned in the center of the loop. Such brace may be of any shape, such as a crossed structure or may be formed of an appropriate length of the same polyvinyl conduit as used to contain the underground service. Having such brace positioned in the center of the loop of cable within the slack receptacle also has the advantage of providing a minimum to which the loop of cable can be drawn ensuring that forming the loop to a still smaller diameter, possibly causing a kink or the like which may damage the service cable, will not occur. Of course, in calculating the amount of available slack stored in the loop, the circumference of the central preferably smooth round central brace/loop retainer must be subtracted. The brace or drum 70 is preferably attached to the center of the lid 44 for the slack receptacle so that after the loop is formed in the receptacle either directly or by first forming exteriorly as shown in FIGS. 16 and 19 and then placed in the receptacle, placement thereafter of the top on the receptacle will then automatically position the drum type brace within the loop within the receptacle. A very convenient and superior method of providing slack in a service cable is thus also provided. Note that in FIG. 21 that the drum 70 is positioned not in the center of the slack receptacle but is displaced somewhat toward the orifices on both ends of the slack chamber through which the cable enters and exits from the slack chamber so the amount of cable finally about the brace/loop retainer and leading from the slack chamber is minimized as well as minimizing changes in direction of the cable.

FIGS. 22 through 25 illustrate a further arrangement of a slack receptacle according to the invention. In this embodiment, which is similar to that shown in FIGS. 11 to 16 and also so far as it embodies a central brace similar to that shown in FIGS. 20 and 21, there is as shown in FIG. 22 a lid for attachment to a slack receptacle with a molded brace 70a in the form of a cross attached to the top and extending out toward the viewer sufficiently to contact the bottom of the receptacle. The extended cross shape is equivalent to the tubular brace shown in FIGS. 20 and 21 so far as bracing is concerned and provides in addition a central mandrel for looping a electrical cable around. FIG. 23 shows the end of the slack receptacle with an opening or slit 61a in the side similar to that shown in FIG. 12, but having a rounded lower section 60b. As shown in FIG. 24 an orifice piece 60b fits within the opening and extends partially upward along the sides and against the bottom of the opening. The orifice piece 60b is grooved and shaped to fit over the edge of the side of the opening stabilizing such orifice piece as shown in FIG. 24. FIG. 25a shows an enlarged side view of the orifice piece or plate 60b and FIG. 25B shows a side view thereof. Two such orifice plates are placed over the cable similar to that shown for the previous embodiments in FIGS. 16 and 19 and a loop is formed in the cable after which such orifice plates are slid down the slots or openings 61a to the bottom. This leaves the upper portion of the slot open, but before or after securing of the top on the receptacle either a further slide element can close the top or the opening or such opening can be closed with duct putty or the like. The smaller orifice piece is easier to handle and position and has been found to work quite effectively provided the opening remaining after its placement is effectively closed in some manner.

Figure 26:
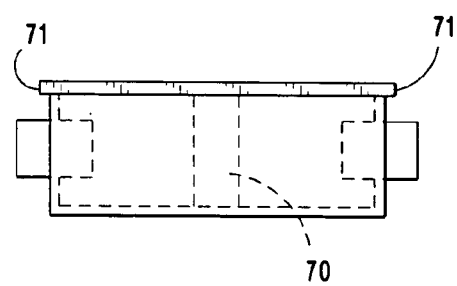
FIG. 26 is a side elevation of a preferred embodiment of the slack receptacle of the invention partially in phantom having a nonsecured box type lid.
Figure 27:
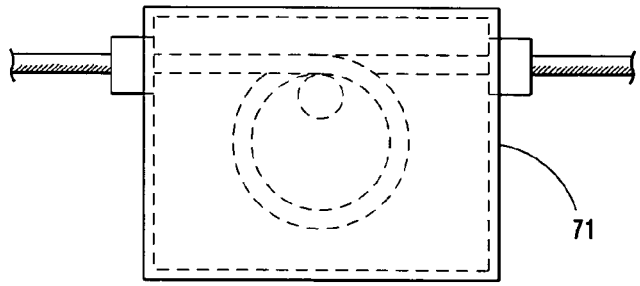
FIG. 27 is a top view also partially in phantom of the embodiment of the slack-type receptacle of the invention shown in FIG. 26.

FIGS. 26 and 27 show a further version of the slack container of the invention wherein the top opening is closed by a box-type lid 44c with short flanges 71 all around the sides overlapping with the top of the sides of the chamber. This has been found to be convenient since workers installing the service cable in a trench either in direct burial or indirect burial, i.e. in conduit usually already installed will be charged with placing the cable loop in the slack chamber as well and such workers typically do not wish to have to fasten the top with threaded fasteners or the like. Having a box-type lid very effectively centers the top on the receptacle and once the excavation is filled holds or maintains the lid or top on the receptacle without specific fastenings. All the installing workers or personnel therefore have to do is to draw out the cable from its coil in whatever packaging it is delivered in, connect it at the street service, run or pull it through whatever conduit is used or, where conduit is not used, lay the cable out in the excavation and when it reaches the slack chamber pass it into the chamber through the proper orifice provided in the side reforming in the slack chamber one of the loops the cable has just been straightened out of, and the cast of which it "desires" to follow to reform a loop, and then draw the cable out of the chamber on the other sided and direct it to the building service. In the event that the slack chamber is provided with slotted openings on the sides into which the service cable can be laid with or without first passing it through a guide for centering in the slot such as the guides 60 shown in FIGS. 14 through 18 the cable can conveniently after application of guides 60 be brought into a single coil or loop above the slack chamber and then laid in the slack chamber already looped preferably about a minimum loop drum or centering means 70. The cable will then conveniently be pressed downwardly into the slack chamber and since the chamber is sturdy the workers will frequently and conveniently press the cable down by stepping or stomping on it so the loop lies uniformly and essentially flat in the slack chamber. Once the coil is securely arranged in the chamber, the lid of such chamber can be merely laid on top and left until the chamber is filled over with about two and a half to three feet of the surrounding ground material often first with a layer or screening of small fractional stone.

The exit and entrance numbers 48 to the slack chamber may be formed of conventional connection fittings for cable conduit. In such event on whichever side of the slack chamber non-direct burial of the cable is effected the necessary conduit can be merely connected directly to the conduit fitting already a part or portion of the slack chamber or a fitting on the end of the conduit can be easily connected to the slack enclosure. See in this regard the disclosure in connection with the embodiment of FIGS. 30 through 33 hereinafter.

A further use of the slack casing or chamber of the invention can be made as mentioned above as follows.

In an older custom for direct burial of electrical service cable as indicated above, a conduit may be run directly into the surface of the ground from the building service and the electrical cable then continued in direct burial further into the ground a safe distance and then angled out toward the street service. In this type of arrangement there is no need for the present inventor's earlier slip-joint development because no downward tension will be placed upon the protective conduit if the ground or backfill subsides. However, as will be recognized, a significant tension may be placed upon the electrical service wire connection and then either broken leaving live wires at the point of the break or the service box may be torn from its mounting upon the building leading also to interruption of power and even if the power is not interrupted will lead to a highly hazardous condition. In addition, if the ground pulls away from the bottom of the protective conduit, the undesirable condition of a live higher then normal voltage electrical wire directly exposed without a protective conduit will result. However, the slack chamber of the present invention can also be used to relieve this condition. Such use may be accomplished as shown in FIGS. 28 and 29 which show respectively a side view and a face-on elevation of the slack chamber of the invention mounted in a novel manner to protect the service.

Figure 28:
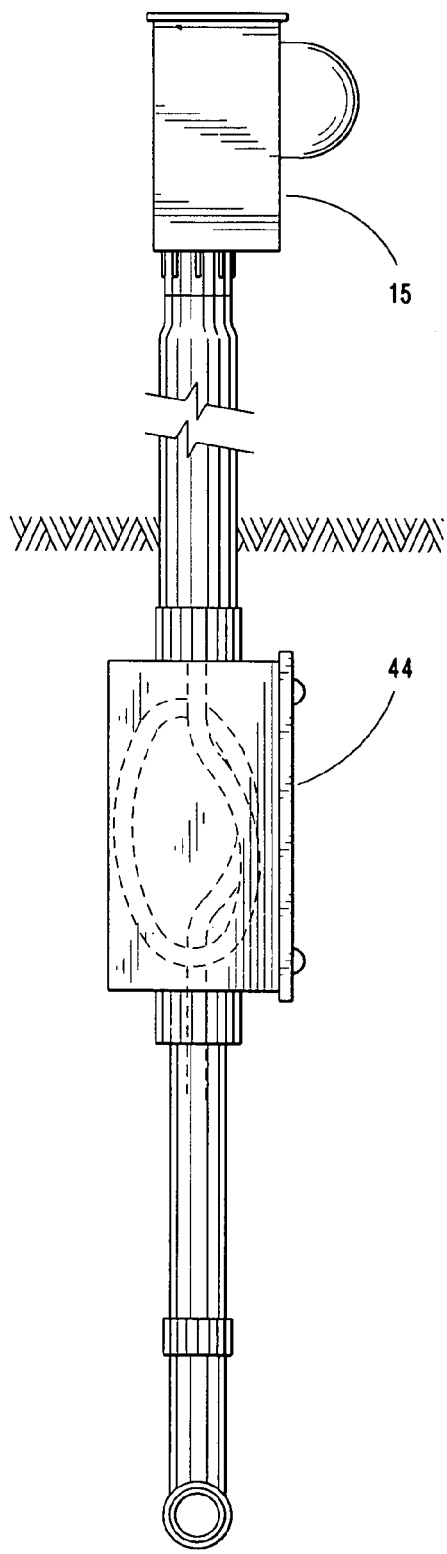
FIG. 28 is a side view of a slack receptacle in accordance with the invention used above ground and attached directly to a building wall near the service attached to the building and attached to conduit leading from such service.
Figure 29:
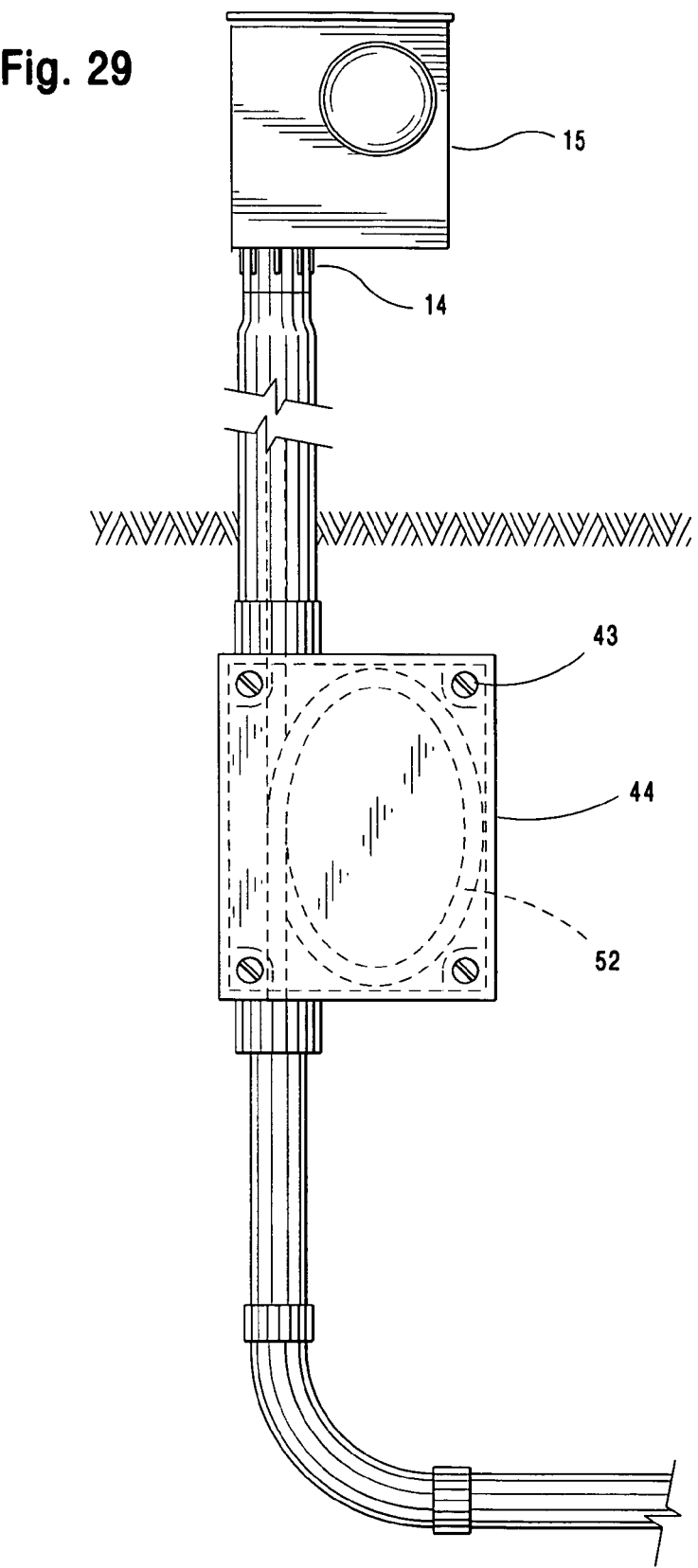
FIG. 29 is a front view of the slack receptacle in accordance with the invention partially buried in the ground adjacent to a building and connected to the service on the building by a conventional conduit.

In FIGS. 28 and 29 the slack chamber 44 similar to that shown in FIGS. 8 and 10 has been attached to the wall or foundation of a building below the building service connection 15 with the slack chamber casing 44 preferably buried in a vertical position with the ground level close to but not over the upper end of the chamber and attached to the building by suitable strapping or brackets or the like 13. The building service 15 and the slack chamber 44 are connected together by electrical conduit 30 and a short section of conduit 30 leads out of the bottom or lower side or end of the slack chamber 44 conducting the electrical service cable into the ground and ultimately to a street service. As will be recognized, if the ground level subsides pulling the electrical service wire 39 with it, the slack chamber 44, since it is only partially buried and, furthermore, is secured to the building wall, will remain in place and the conduit between them will also not be disturbed. However, as the ground subsides with a declining level of the ground surface upon the sides of the slack chamber 44 tension will be placed upon the electrical service cable extending into the ground. As a result, the cable slack loop 52 contained in the slack chamber is able to be reduced in diameter paying out slack and preventing damage to the run of cable in the electrical service. As will be recognized, when the slack box of the invention is placed in a vertical position as shown in FIGS. 35 and 36 it is necessary that the top or lid of the chamber should be secured in some effective manner to the rest of the chamber so the electrical service line loop will not be unduly exposed. In FIGS. 28 and 29 this is accomplished by having screw threaded fastenings securing the top.

FIGS. 30 through 33 show an especially designed and preferred embodiment of the slack chamber of the invention constructed as a two part interfitting case or casing adapted to contain a single loop of electrical cable sufficient to adapt for up to three feet of fill subsidence and providing for the holding of a conventional conduit fitting at either or both ends. An integrally molded central drum also doubles as an integral securing means for the two sections of the casing. No more space is provided within the chamber than actually is necessary to contain the single loop of cable slack and the central drum is large enough to prevent the loop of cable within from reducing too much in diameter. The shape of the slack chamber on the outside follows generally the interior slope necessary to entertain or accommodate a straight run of overlapping cable at one side and a somewhat flattened loop of cable on the other side. As a result it has been found that the interior space of the chamber is minimized restricting the flow of silt containing fluid into and out of the chamber so that any accumulation of silt and/or mud within the chamber is minimized and there is consequently very little chance that loops, or the loop, of the cable within the chamber should become "silted up" so to speak causing the cable to become effectively bound in position and unable to pay out its retained slack. Any requirement to use duct compound to seal the chamber is therefore minimized if not obviated.

Figure 30:
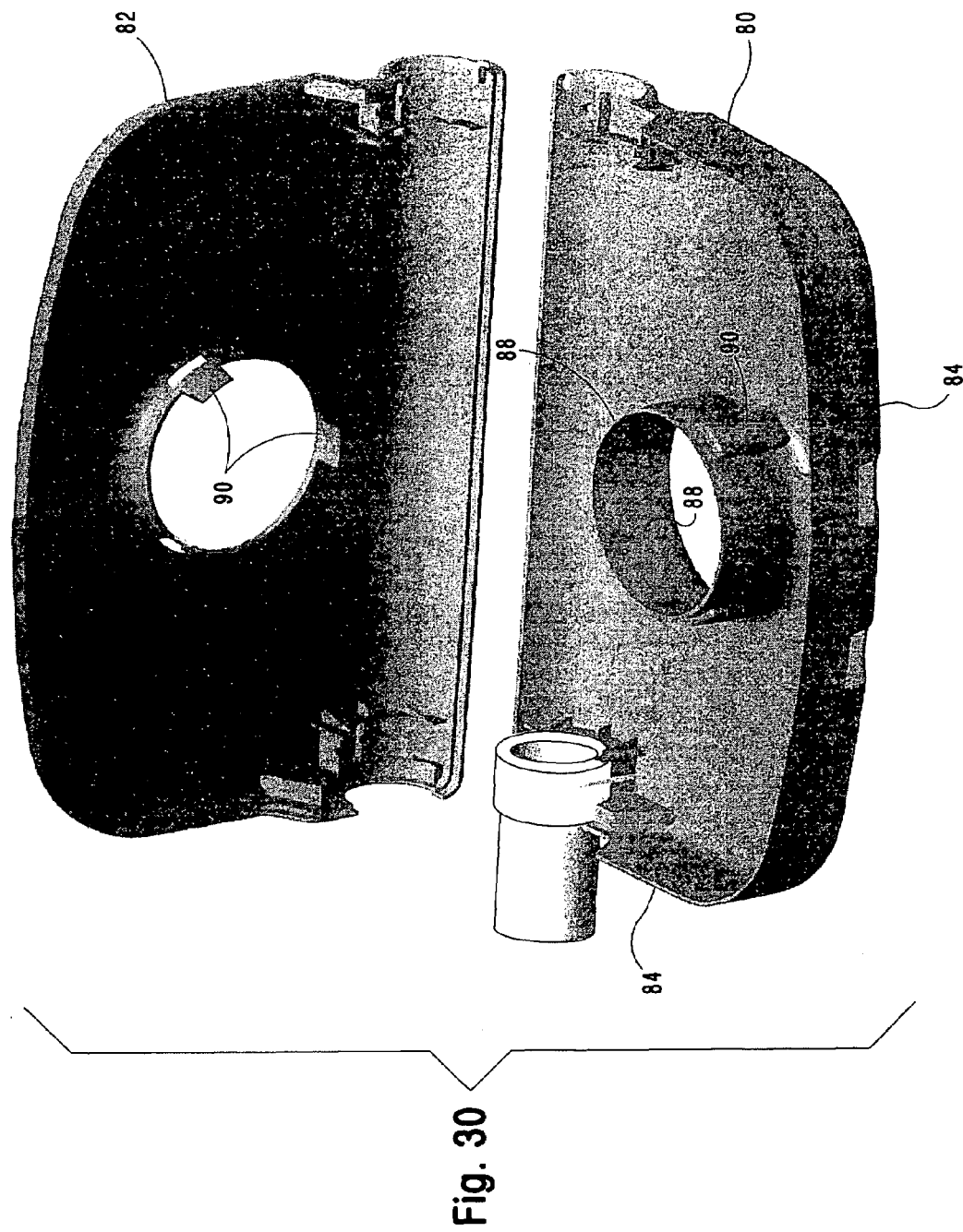
FIG. 30 is a perspective view of a presently preferred molded two section slack chamber casing according to the present invention with the two sections in position to be attached together showing the inside, but before a cable loop is installed therein.
Figure 31:
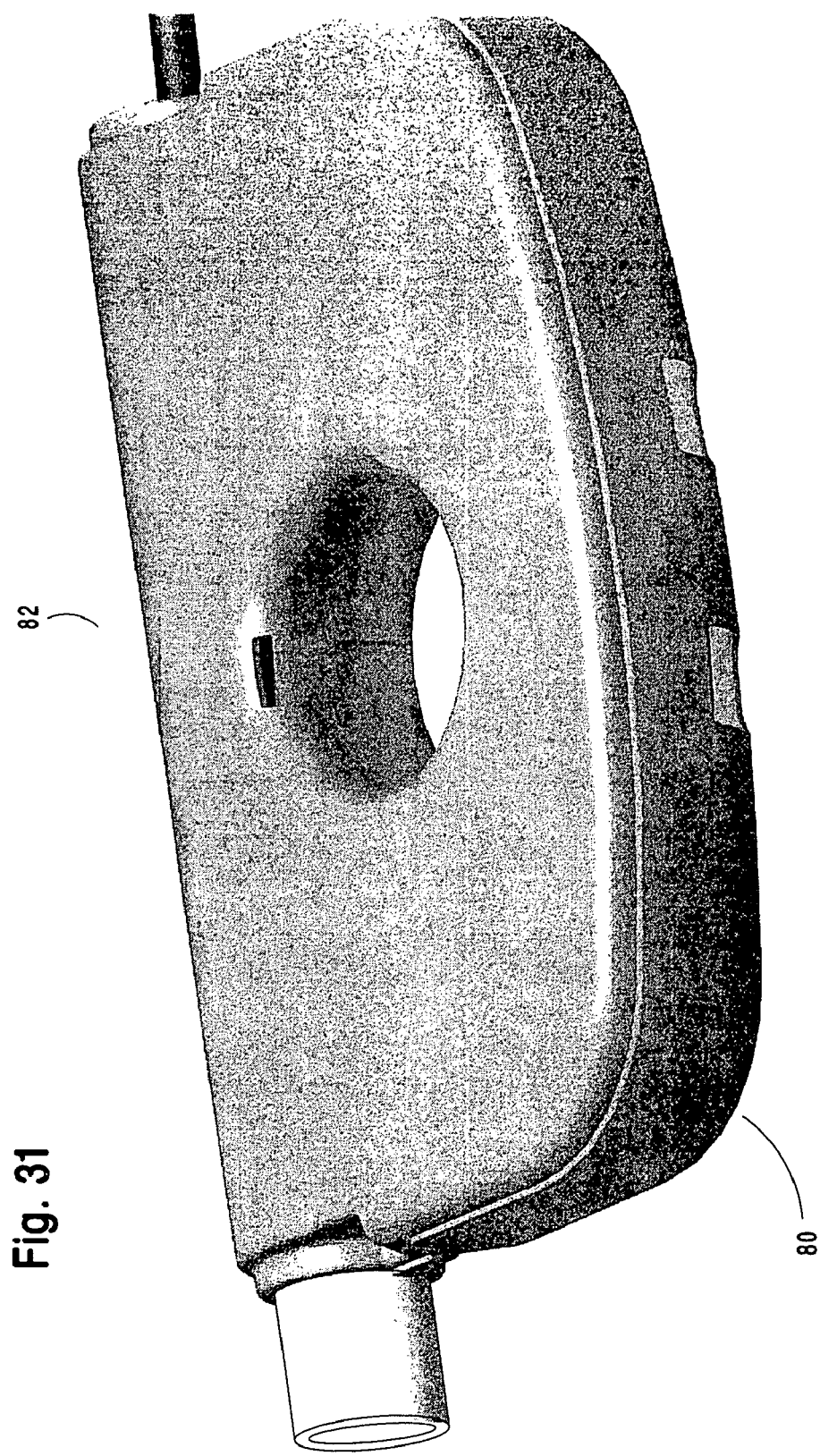
FIG. 31 is a perspective view of the slack chamber casing sections shown in FIG. 30 attached or mounted together with a cable loop within, the view being of the top.

FIG. 30 is a perspective view from the top and away from the loop side of the slack chamber with the bottom section or casing 80 resting on a surface, such as, for example, the bottom of a cable excavation not shown and the top section or casing 82 held slightly above in an open position. The bottom casing has an outer side wall 84 which extends completely about the bottom casing section and the top 82 has a matching sidewall 86 slightly smaller in overall dimensions which when the top 82 and bottom 80 casings are brought together enters or slides into the bottom casing as seen in FIG. 31. A central round or generally curvilinear hub 88 extends upwardly from the bottom casing 80 and has several outward expansions 90 which provide undercut sections 92, seen best in FIG. 32, which figure is a view of the inside of the bottom casing 80 with a loop of electric cable or conduit 52 in place. When the top section or casing 82 is brought down upon the bottom section or casing 80 with the two fitting together as shown in FIG. 31 detents 94 pressed out of the central ring wall or hub 92 of top casing 82, when the top casing is closed upon and fitted into bottom casing 80, and by spring or resilient action extend into the matching outer extensions 90 on the central hub wall 88 effectively securing the top and bottom casings 82 and 80 respectively together. When it is desired to remove the top casing 80 from the bottom casing, one can reach into the open hub and pull the detents 94 outwardly. The same procedure can be used to bring the two casings together with the top ring within the lower casing ring after which the detents can be released and will spring into position within the outward expansion 90. Three detents 94 may be supplied, but, if one is removed, opening or pulling such detents away from the central bottom hub casing with only two hands or the fingers of two hands is facilitated. If such detent is not removed or broken away or one of the detents is not omitted initially, two persons may have to release the detents to bring the two casings together. It will be noted in FIG. 30 the one of the three detents 94 has been removed. The central hub 88 on the bottom casing extends into contact with the upper casing 82 when the two casings are closed together and provides vertical strength and stiffness to resist the load of the overburden and other vertical loads when the closed casing is in place.

Figure 32:
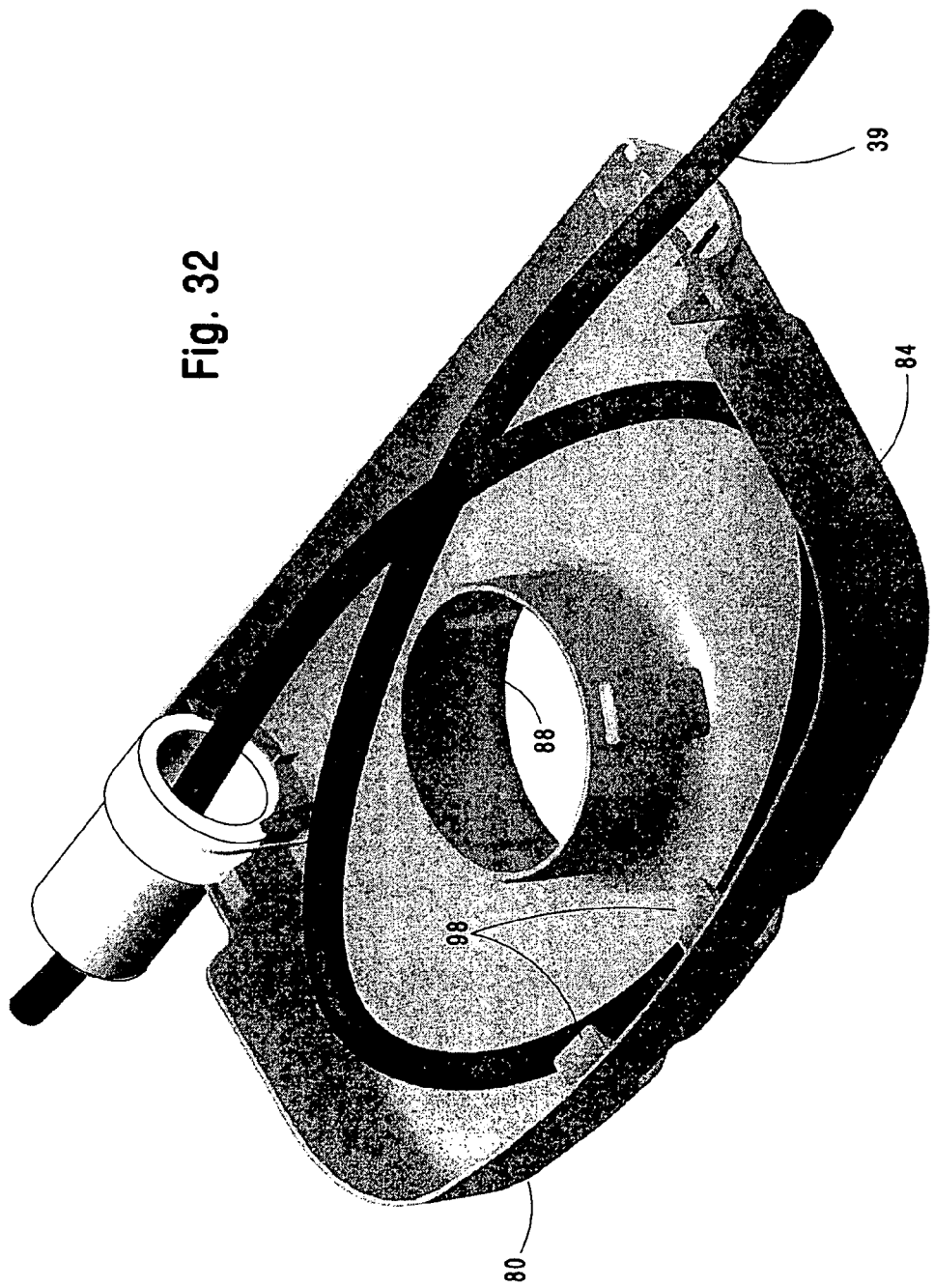
FIG. 32 is a perspective view of the lower portion of the slack chamber casing with a cable loop therein.
Figure 33:
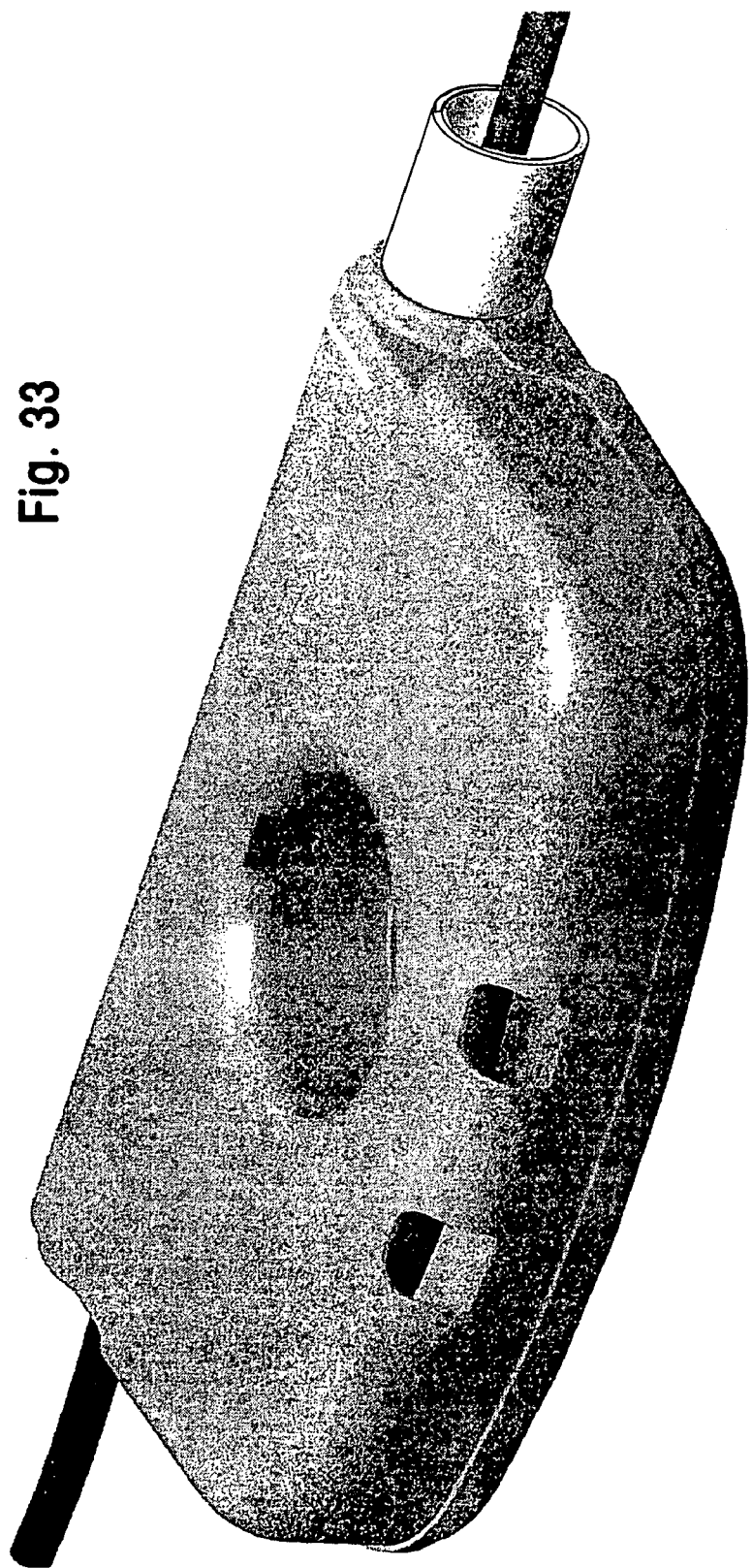
FIG. 33 is a perspective view of the closed slack casing with a loop of cable therein.

FIG. 34 is a bottom view of the slack chamber showing the cable 39 exiting from both ends of the combined casings. Two pressed in portions 96 can be seen at the near side with sections of the electric service cable visible through such pressed out (or in) portions. FIG. 32 shows the inside of the bottom section or casing and it can be seen that the pressed in sections or portions 96 serve as detents or guide sections 98 to keep the cable loop from rotating upwardly when the casing is open. It will be understood that although the pressed out portions 94 and 96 leave openings in the plastic wall of the top and bottom casings the decreased volumetric capacity of the slack chamber embodiment shown in FIGS. 30 to 34 tends to limit the inflow of silt laden moisture to the slack chamber such that locking up of the slack loop of the cable 39 by consolidated silt is unlikely to occur during the period of likely subsidence of the usual backfill material in new construction. Where experience indicates that difficulty with silting up of the slack chamber may be encountered the openings or orifices can be closed as explained earlier by direct compound. The curvilinear design of the casing adds rigidity and strength to the closed casing.

At the ends of the slack chamber on both the top and bottom casings there is molded a series of inwardly projecting detents and/or molded sections 98 adapted to retain between the top and bottom casings at the entrance and "exit" or two cable openings 100 of the combined casings standard electrical conduit connectors or fittings. Such fittings can be applied to the desired conduit sections and the fitting then placed in the position where it will be secured by the closing of the two casings together. It can be held in such area temporarily by narrow strapping for initial passage of the cable through and then when the top casing is placed in or closed upon the bottom casing will be securely grasped or held between the casings. If a conduit is to be used on only one side of the slack chamber the other side can be merely left open with the cable passing through the opening. Alternately, a conduit fitting may be placed at the exit from the closed casing with the fitting unconnected to any conduit, but the electrical cable passing through the fitting. The clearance between the fitting and the electrical cable can be closed with a closure material such as duct compound or the like.

While polyvinylchloride material of various analysis are usually specified for electrical conduit and particularly for applications where some electrical connections are made, no electrical connections are normally made in the slack chamber of the invention and in addition since it is used underground any supply of oxygen which might support combustion is rather severely limited. Thus, there is little if any fire hazard and it is not believed fire resistance should be a significant factor unless the slack chamber was to be used above ground level in which case the preferred material of construction would be one of the fire resistant compositions of PVC. A preferred composition for the molded embodiment of the invention shown in FIGS. 30 through 33 is presently polyethylene containing about 20% by weight of glass spheres or the like. The preferred dimensions are 28 long by 18 inches wide and between 4 and 4.5 in thickness or height.

The slack receptacle of the invention can be placed in the center of or partway through a run of underground conduit protecting electric service wire or can be placed at the end of such protective conduit where the service cable continues outward to a service pole or distribution point. If the slack receptacle is in the center of a run of conduit it may not be necessary to seal the orifices in it leading to such conduit, but, as explained, it is desirable to seal any openings leading directly to the underground surroundings to prevent the accumulation of materials in the receptacle that may immobilize or partly immobilize the cable and prevent slack from being paid out. Because of the relatively restricted design of the embodiment shown in FIG. 30 through 34 which is a preferred design, the exclusion of outside moisture with a possible damaging load of silt or the like may not be as important.

In general, it is preferable to use the slack casing or chamber of the invention as close to where initial tension from ground subsidence will initially occur, since the considerable residence to paying out of slack cable may occur even when such cable is snaking through a conduit and if such cable is direct buried it will be essentially immobilized within a few inches. Thus, it is preferable for the slack casing or chamber of the invention to be positioned to be placed as close to the building service as possible usually immediately after the usual curved conduit section leading an electric service from a vertical downward orientation to a horizontal run to street service.

The slack chamber shown in FIGS. 30 through 33 can also effectively be used in the manner shown in FIGS. 28 and 29 and it may be desirable in such case that the three detent arrangement be provided to maintain the two casings together so that a single person cannot readily disconnect the top or outside casing from the bottom or inner casing. This second use of the slack chamber of the invention against the wall of a building near the ground surface, rather than an entirely underground position will be recognized as being also a novel and unobvious arrangement for protection of electrical service lines in the case of subsidence of the ground particularly in backfilled locations which are particularly subject to such subsidence or in the case of other ground movement which might place undesirable tension in electrical service wires.

As will be evident from the above, the present Applicant's invention solves a significant problem in the electrical power and building industries for which no practical remedy has heretofore been suggested or even in some cases recognized. Furthermore, the invention is both relatively inexpensive and easy and convenient to implement as well as being highly effective for its purpose.

As will be readily recognized, the fittings of the two related inventions of the present inventor when used together provide the adjustability necessary to allow the electrical service to a building to be readily connected while allowing complete and continuous shielding of the electric cable yet allowing for sinking of the fill around a building structure without pulling the electric service lines loose form the building or exposing such service lines to possible contact with the elements, or weather, or persons who may be in the vicinity. The slack adjuster portion of the combined invention provides a very neat solution to the problem of having insufficient slack in the service cable extending to a building to allow for substantial settlement of backfill around such building in which underground service cables are buried. While the invention has not been tried for used in earthquake zones, it is also believed it may limit damage to underground electric service during relatively severe earthquakes and the like when due to shocks and movements in the ground underground service lines may be broken or otherwise seriously damaged. As will be recognized, the construction of the slack receptacle of the invention is such that it can payout slack in a service installation substantially instantaneously to adjust to the sudden and sever tension in electrical wires which frequently occur during severe earthquakes.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A hollow casing for storing slack exterior service cable for payout in case of ground subsidence about underground service cable to prevent damage of building service to which the cable is connected said slack cable casing comprising:
   (a) separate cooperating top and bottom sections defining an internal configuration and volume such as to store at least a single loop of heavy electrical exterior building service cable in a condition in which such cable is readily withdrawable from the casing upon tension being applied to the cable from outside the casing as a result of tension engendered by earth movement,
   (b) the construction of said casing being such as to resist a weight applied to the casing equivalent to the weight of several feet of earth and rock plus normal above ground objects and personnel,
   (c) two opposed notch shaped openings in opposite sidewalls of the bottom section of the casing for free passage of the cable through at least one of such openings when the top and bottom sections of the hollow casing are assembled together,
   (d) the assembled casing being wider and longer than it is high by a significant ratio,
   (e) a central reinforcing member mounted in the bottom section of the casing such as to reinforce the hollow casing in its narrowest dimension by contact with the top section when the top and bottom sections are closed and when disposed underground and further serving as a central cable loop stabilization member,
   (f) such central reinforcing and cable loop reinforcing means having a diameter less than half the side to side dimension of the hollow casing and biased to one side of the hollow casing close to a direct line between the two opposed openings in the side of the assembled casing,
   (g) the opposed openings in the side walls of the bottom section of the hollow casing being unrestricted toward the open side of the bottom section when the top of the casing is removed from the bottom allowing convenient formation of a loop of exterior building service cable above the bottom section of the hollow casing with the top removed and placement thereof in one half of the casing with the ends of such loop extending in opposite directions from the body of the casing and allowing the two halves of the casing to be recombined about the heavy exterior cable.

2. The hollow casing in accordance with claim 1 wherein the casing is wider and longer than it is high by a significant ratio.

3. The hollow casing in accordance with claim 2 additionally comprising:
   (d) a central reinforcing member in the casing reinforcing it from top to bottom in the narrowest dimension said reinforcement further serving as a central loop dimension stabilization means.

4. The hollow casing in accordance with claim 1 having a rectallinear configuration with openings in opposite sides adapted to receive adjustable cable guides.

5. The hollow casing in accordance with claim 4 wherein the upper section of the casing fits together with the lower section of the casing to form substantially a closed casing except for the opposed openings through which heavy exterior cable extends.

6. The hollow casing in accordance with claim 4 wherein the openings in opposite sidewalls are adjacent one wall or side of the casing.

7. The hollow casing in accordance with claim 6 wherein the casing is formed of two more or less equal halves which snap together.

8. The hollow casing in accordance with claim 7 wherein detents for the two halves are provided on two interfitting central loop dimension minimizing structures.

9. The hollow casing in accordance with claim 6 wherein the one side of the reinforcing and loop dimension stabilization means is in line with the opposed openings in opposite sides of the casing.

10. The hollow casing in accordance with claim 1 being formed in a curvilinear configuration providing structural rigidity.

11. The hollow casing in accordance with claim 1 wherein said casing is buried in the end of a conduit leading from an electrical service means on a building wall.

12. The hollow casing in accordance with claim 11 wherein the casing is positioned underground not less than several feet below ground level and receives a conduit leading from an electric building service and is connected by cable on the opposite side extending underground to street service and the casing is horizontally oriented.

13. The hollow casing in accordance with claim 11 wherein the casing is buried in a vertical position at least partially underground and attached to a building below the building service through a conduit.

14. A method of preventing damaging tension from being applied to a building electric service from buried heavy exterior electrical service lines as a result of fill subsidence adjacent the building upon which said building electrical service is mounted comprising:
(a) at the time of installing an underground service line providing a hollow two part slack chamber buried at least partially below ground level in general line with the underground service line,
(b) before the underground service line is connected to the building electric service opening the incompletely buried slack chamber,
(c) at the time of connecting the electric service line to the electric services, forming a full loop in the service line and depositing said loop in one section of the open slack chamber with the ends extending from opposite sides of the slack chamber,
(d) closing the slack chamber,
(e) completing at least partial burial thereof and completing connection between the building service and street service,
(f) retaining said loop in the loop in the slack chamber until ground subsidence results in exterior tension upon the cable and results in sufficient tension upon the cable within chamber to withdraw at least some of the cable from the chamber thereby relieving such tension,
(g) the maximum withdrawal of cable from the slack chamber being governed by a central loop stabilization member about which the cable is looped within the slack chamber.

15. A method of prevention of damaging tension in building electric service in accordance with claim 14 in which the slack chamber is provided in a portion of an underground service connection excavation in line with the run of an underground electric service cable.

16. A method of prevention of damaging tension in building electric service in accordance with claim 14 in which the slack chamber is provided partially buried under the building service and connected to a wall of the building receiving the underground electric service.

17. A method of prevention of damaging tension in building electric service from heavy exterior electric service lines in accordance with claim 14 wherein when installing an underground service line the slack chamber is buried near the end of the heavy service line which is being installed underground and, with the top of the slack chamber open, a loop is formed in the underground service line and deposited in the slack chamber with the top open with sections of the cable extending from orifices in both sides of the slack chamber, the top of the slack chamber is then replaced in a closed configuration and the slack chamber is thereafter buried with the service line.

18. A method of preventing damaging tension in heavy service line in accordance with claim 17 in which the loop in the service cable is deposited over a central reinforcing and stabilization member extending in close contact with the top and bottom of the slack chamber when closed and considerably smaller in diameter than the loop when installed in the slack chamber, but generally defining the amount of slack cable provided in the slack chamber and the general position of the loop in the slack chamber.

19. A method of preventing damaging tension caused by ground subsidence upon the entrance electric service of buildings served by heavy underground service cable extending from an electrical supply network comprising at the time of installing such electric service:
(a) providing a multi-section prefabricated cable slack providing chamber the top section of which is capable of withstanding without damage at least the weight of earth and rock present at a depth at which the entrance electrical service is to be covered at completion of installation the top section being removable for access to the interior, said slack chamber being wider and longer than its height and having a reinforcing and loop stabilizing member in the interior adjacent to two oppositely disposed cable openings in the sides of the slack chamber, said reinforcing and loop stabilizing means having a diameter less than half of the diameter of the slack chambers, both of the oppositely disposed openings being unrestricted from the top when the slack chamber is opened in order that sections of the heavy electrical service cable may be inserted transversely into the openings without impediment, whether due to movement transversely into the opening or longitudinally through the openings due to tension on the cable during use, the opposite portion of the slack chamber having a configuration such as not to be impeded from securing in place by a portion extending into the space of the openings or to impede longitudinal movement of heavy cable through such openings,
(b) placing the slack chamber in an enlarged portion of an excavation provided for underground placement of the heavy service entrance cable,
(c) removing the upper portion of the slack chamber,
(d) forming the heavy electrical service cable into a loop,
(e) placing such heavy electrical service cable in the slack chamber with the loop curved about the loop stabilizing member with the ends of the loop extending through the oppositely disposed openings, one toward the power supply and one toward the building service,
(f) replacing the other section of the slack chamber,
(g) connecting end extending toward the building with the building service, and filling the cable service excavation covering the slack chamber and service cable with a predetermined amount of ground material, and
(h) allowing the loop of cable to remain in the slack chamber until withdrawn by tension engendered in the cable by ground subsidence with cable sections originally in said loop relieving the tension by being drawn out of the slack chamber.

20. A method of preventing damaging tension derived from ground subsidence in accordance with claim 19 wherein when the opposing portion of the slack chamber is placed together with portion in which the heavy service cable has been placed, the opposing portion not placing any restriction on movement of the cable.

21. A method of preventing damaging tension by ground subsidence in accordance with claim 19 wherein the diameter of the reinforcing and loop stabilizing means is less than one third of the width of the interior of the slack chamber and the loop deposited within the slack chamber is formed before deposit with a diameter equal to somewhat less than the interior diameter of the smallest diameter of the slack chamber providing an amount of slack which can potentially be paid out upon tension being applied to the cable by ground subsidence of ground level adjacent the building, the mathematical relationship of pi times one half the smallest of the slack chamber diameter minus the mathematical relationship of pi times one half the diameter of the loop stabilization means determining the maximum amount of cable withdrawal.

22. A hollow casing in accordance with claim 1 in which the central reinforcing and cable loop reinforcing member has an effective diameter of less than one third the side to side dimension of the hollow casing.

* * * * *